(No Model.) 6 Sheets—Sheet 3.

P. MILES.
FENCE MAKING MACHINE.

No. 389,590. Patented Sept. 18, 1888.

WITNESSES:
Gustave Dieterich
T. F. Bourne

INVENTOR
Purches Miles
BY Briesen & Steele
ATTORNEYS (No Model.) 6 Sheets—Sheet 4.

P. MILES.
FENCE MAKING MACHINE.

No. 389,590. Patented Sept. 18, 1888.

WITNESSES:
Gustaveh Dieterich
T. F. Bourne.

INVENTOR
Purches Miles
BY Briesen & Steele
ATTORNEYS.

(No Model.) 6 Sheets—Sheet 5.

P. MILES.
FENCE MAKING MACHINE.

No. 389,590. Patented Sept. 18, 1888.

WITNESSES:
Gustave Dieterich
T. F. Bourne

INVENTOR
Purches Miles
BY
Briesen & Steele
ATTORNEYS (No Model.) 6 Sheets—Sheet 6.
P. MILES.
FENCE MAKING MACHINE.
No. 389,590. Patented Sept. 18, 1888.
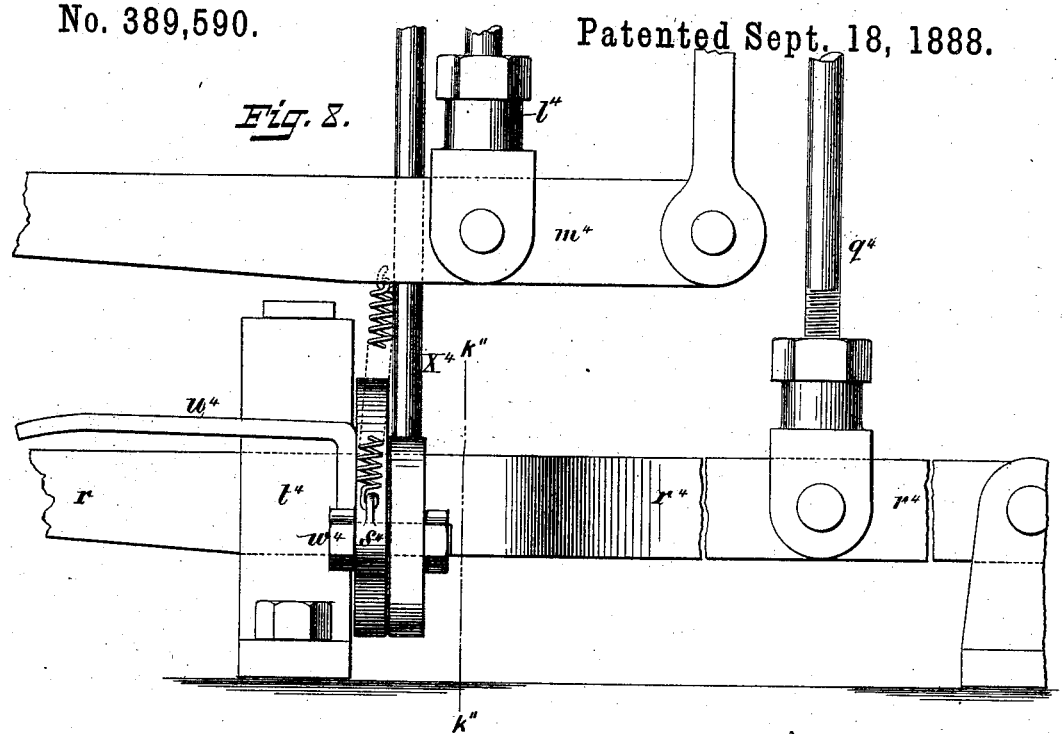
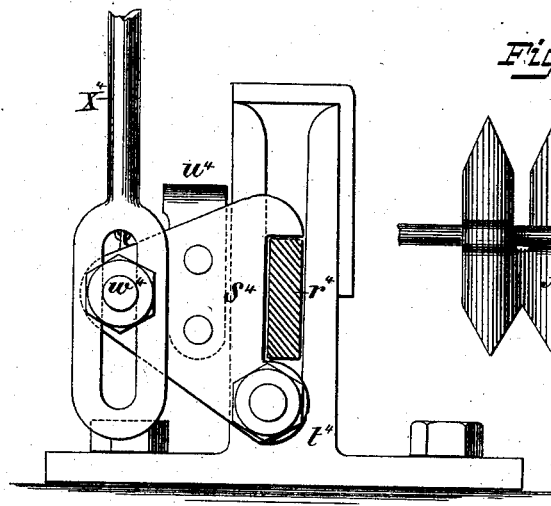
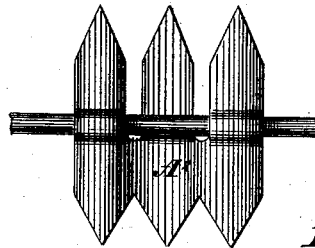
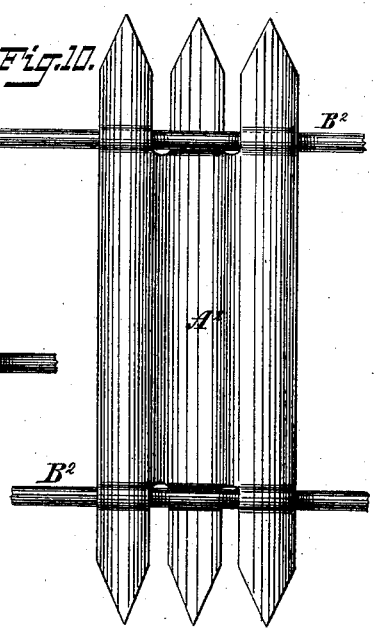
WITNESSES:
Gustave Dieterich
T. F. Bourne.
INVENTOR
Purches Miles
BY Briesen & Steele
ATTORNEYS

UNITED STATES PATENT OFFICE.

PURCHES MILES, OF BROOKLYN, NEW YORK.

FENCE-MAKING MACHINE.

SPECIFICATION forming part of Letters Patent No. 389,590, dated September 18, 1888.

Application filed May 12, 1888. Serial No. 273,676. (No model.)

*To all whom it may concern:*

Be it known that I, PURCHES MILES, a resident of the city of Brooklyn, Kings county, New York, have invented an Improved Fence-Making Machine, of which the following is a specification.

The object of my invention is to provide a machine for making picket-fences and analogous structures. One such fence is shown in Patent No. 381,942, of May 1, 1888.

The invention consists in the details of improvement and the combinations of parts that will be more fully hereinafter set forth and claimed.

Reference is to be had to the accompanying drawings, forming part of this specification, in which—

Figure 1:
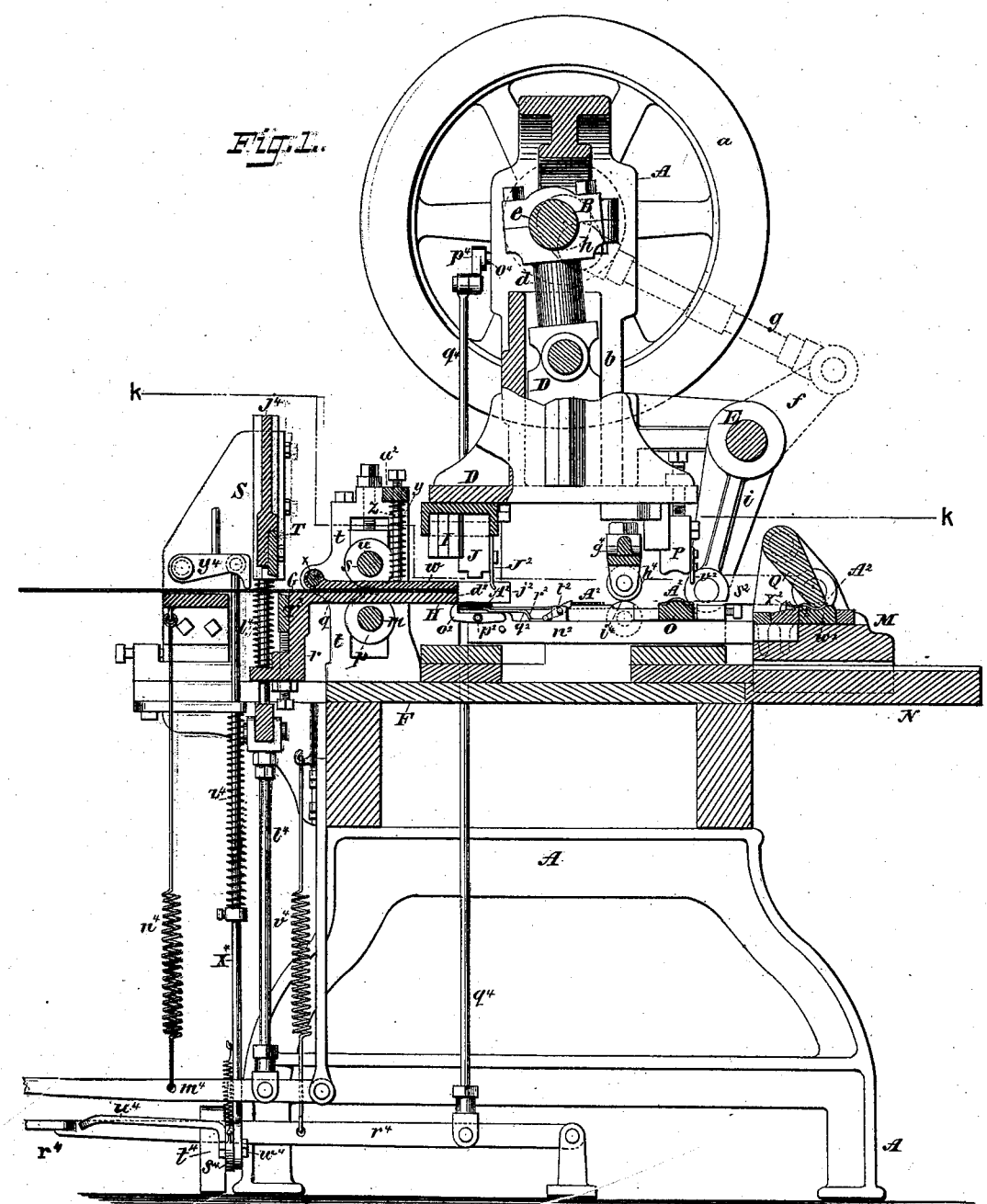
Figure 2:
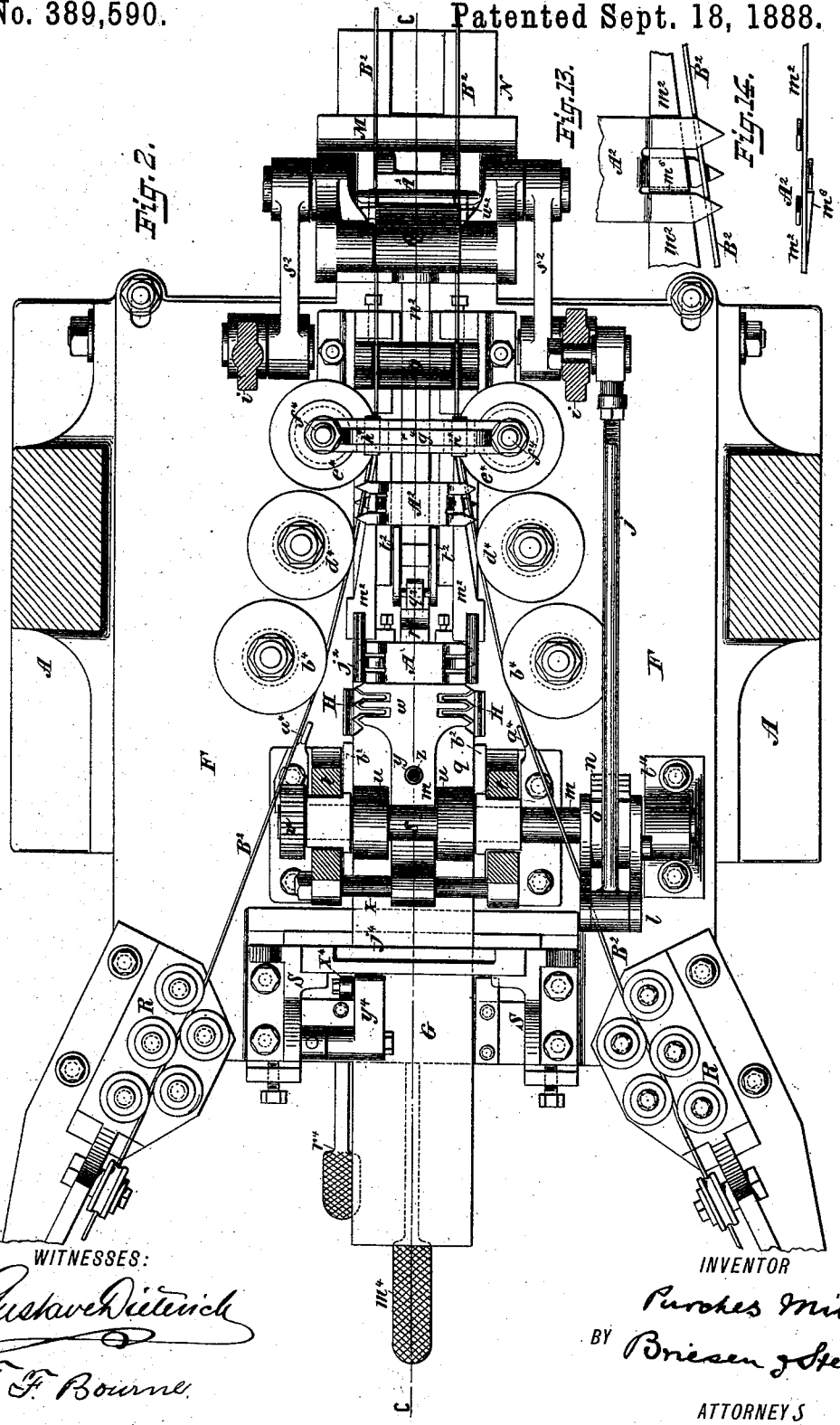
Figure 3:
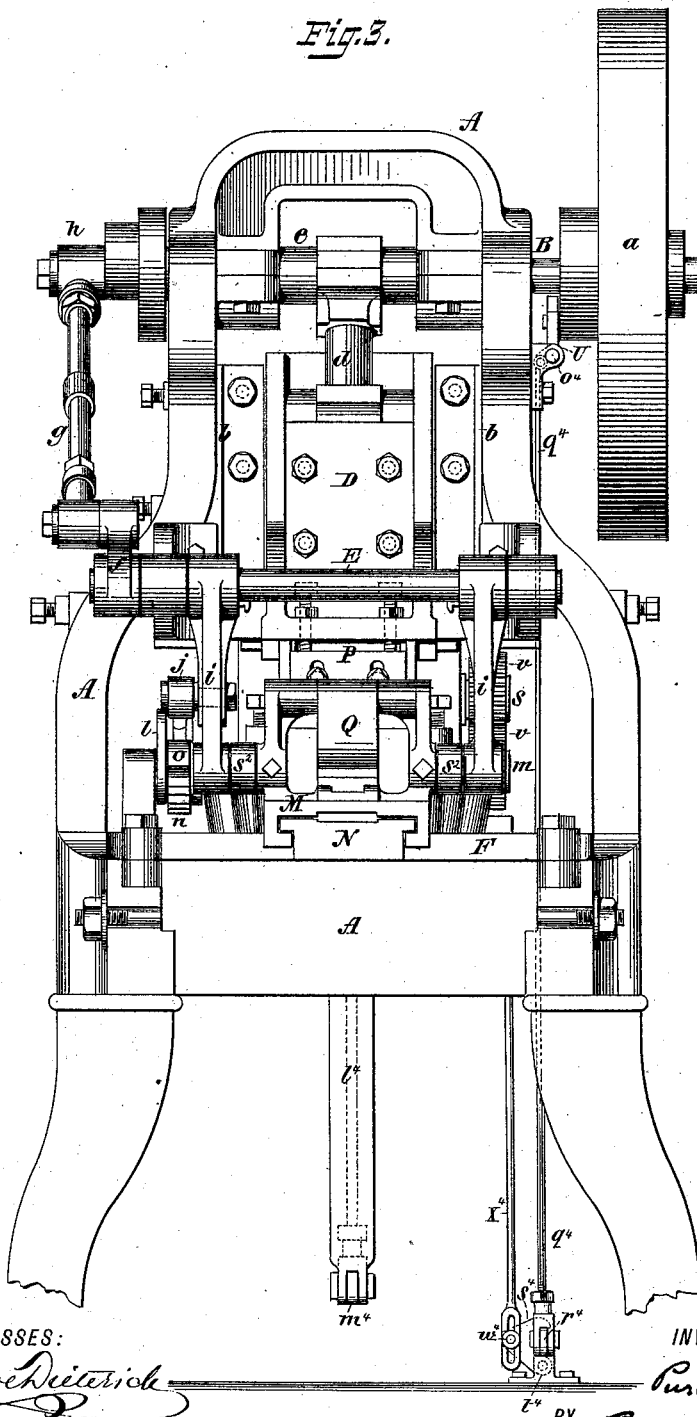
Figure 4:
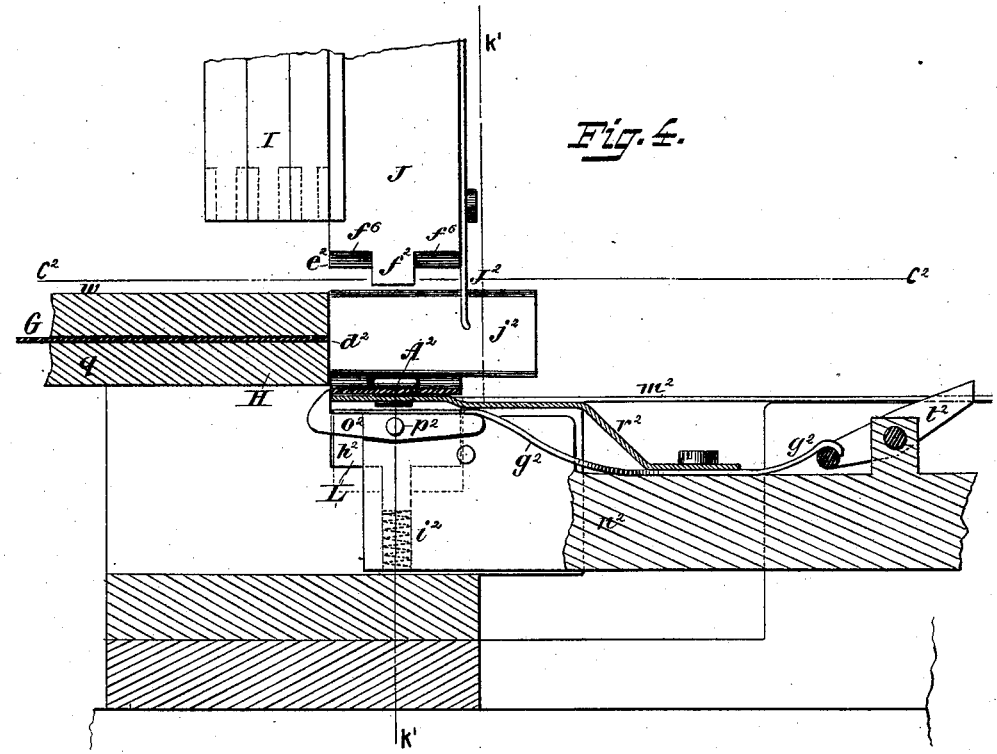
Figure 5:
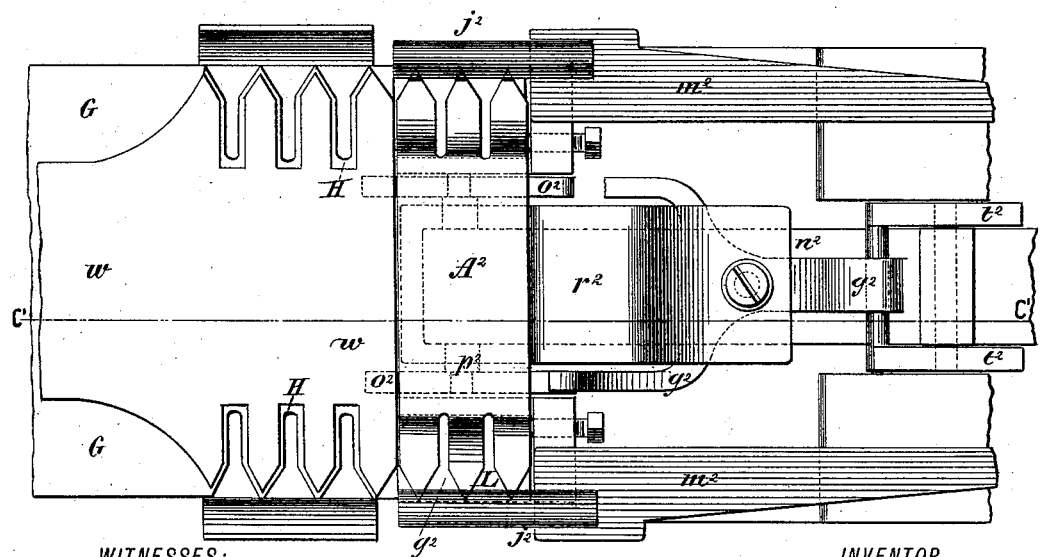
Figure 6:
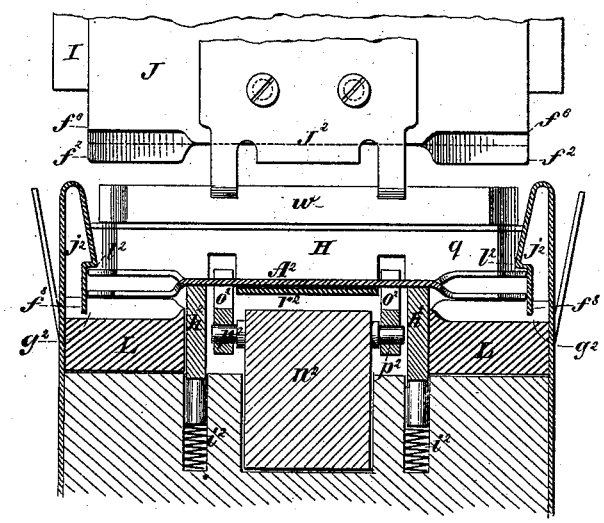
Figure 7:
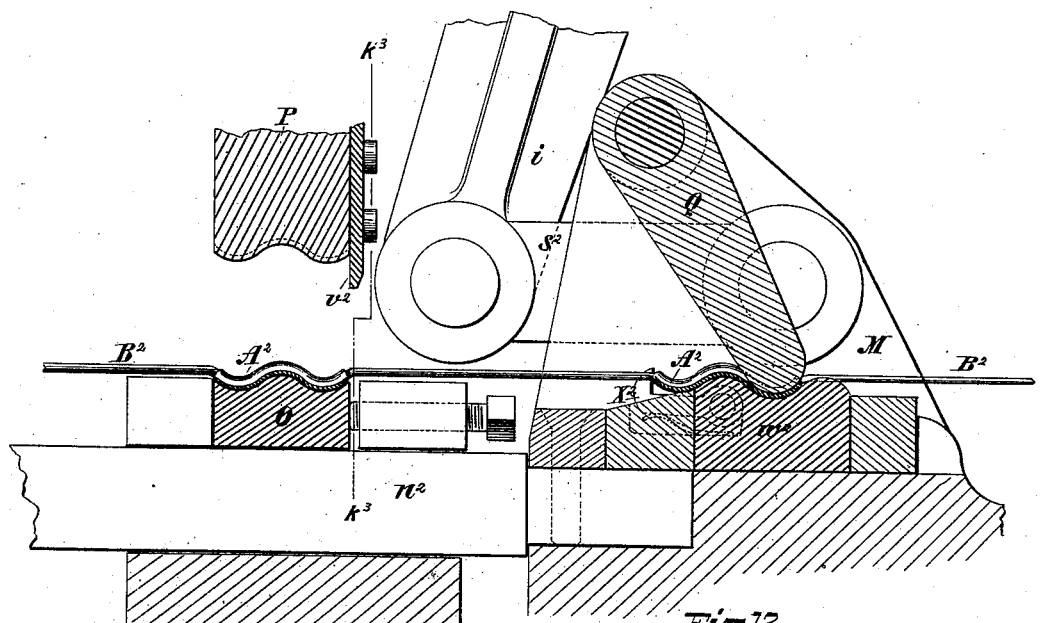
Figure 12:
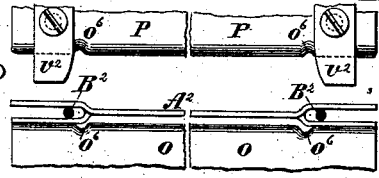

Figure 1 is a vertical longitudinal section of my improved machine on the plane of the line $c\ c$, Fig. 2. Fig. 2 is a horizontal section, enlarged, on the plane of the line $k\ k$, Fig. 1. Fig. 3 is an end elevation of the machine, enlarged. Fig. 4 is a detail section, enlarged, on the plane of the line $c'\ c'$, Fig. 5. Fig. 5 is an enlarged detail plan view on the plane of the line $c^2\ c^2$, Fig. 4. Fig. 6 is an enlarged detail cross-section on the plane of the line $k'\ k'$, Fig. 4. Fig. 7 is an enlarged detail section on the plane of the line $c\ c$, Fig. 2. Fig. 8 is an enlarged detail view of part of the treadle mechanism shown in Fig. 1. Fig. 9 is an enlarged detail sectional view on the line $k''\ k''$, Fig. 8. Fig. 10 is a face view of my improved picket attached to its supporting-wires. Fig. 11 is a face view of a modified form of picket. Fig. 12 is a face view of the lower part of the dies O P on the line $k^3\ k^3$, Fig. 7. Fig. 13 is an enlarged detail plan view of part of the picket guide-rails, and Fig. 14 is an edge view thereof.

In the accompanying drawings, the letter A represents the frame of my machine, which is of suitable construction.

B is the main driving-shaft of the machine, which carries a pulley, $a$, that is loose on said shaft, but which is made rigid therewith by a suitable clutch mechanism. (Not shown.)

D is a reciprocating plunger that is guided in suitable bearings, $b$, in the frame A, which plunger carries the cutting and stamping dies, as hereinafter shown. The plunger D connects by a rod, $d$, with an eccentric, $e$, on the main shaft B, whereby said plunger is reciprocated.

E is a rock-shaft suitably journaled in bearings in the frame A. The shaft E carries a crank, $f$, that connects by a rod, $g$, with an eccentric, $h$, on the main shaft B, by which means the shaft E is rocked in its bearings. The shaft E also carries pendent arms $i$, one of which arms connects by a rod, $j$, with a lever, $l$, that is loosely hung on a horizontal shaft, $m$, that is journaled in suitable bearings, $t\ t^{10}$, on the bed F of the frame A. The shaft $m$ carries a ratchet-wheel, $n$, that is engaged by a pawl, $o$, carried by the lever $l$, whereby as the shaft E is rocked the shaft $m$ will receive intermittent rotary motion. The shaft $m$ carries one or more rollers, $p$, that straddle or pass through a plate, $q$, that is supported by projections $r$ on the bed F of the machine. Above the shaft $m$ is a short shaft, $s$, that is suitably journaled in the bearings $t$, in which part the shaft $m$ is journaled or is otherwise carried. The shaft $s$ carries rollers $u$, that are above the rollers $p$, and that are adapted to come in contact with said rollers $p$. The rollers $p\ u$ are the feed-rollers for the sheet metal G. The shafts $m\ s$ are geared together by spur-wheels $v$, (see Fig. 3,) whereby as the shaft $m$ is turned by the lever $l$ the shaft $s$ will also be turned, and thereby the feed-rollers $p\ u$. The sheet of metal G, from which the pickets $A^2$ are made, is passed into the machine between the rollers $p\ u$, and is fed along by these rollers, as hereinafter shown.

$w$ is a tongue or plate that is placed above the plate $q$, and it is carried at one end by a shaft, $x$, that is journaled in the supports or bearings $t$. The sheet of metal G passes between the plates $q\ w$, and the plate $w$ is kept pressed upon said sheet of metal G by a spring, $y$, that surrounds a guide-rod, $z$, which projects upwardly from upon the plate $w$ and through a cross-bar, $a^2$, on the supports or bearings $t$, said spring $y$ pressing at one end against the said cross-bar and at its opposite end against the plate $w$. The sheet metal G is guided on the plate $q$ between upwardly-extending legdes $b^2$ at the sides thereof. (See Fig. 2.)

The inner or free end of the plate $q$ is in the form of a female die, H, (see Figs. 2 and 5,) by which the fingers or prongs on the ends of the pickets $A^2$ (shown in Figs. 10 and 11) are cut. The plate $w$ is similarly shaped above the die H, and acts as a stripper. The outer edge, $d^2$, of the die H (see Fig. 4) is constructed to act as a cutter, as presently shown. Above the female die H the plunger D carries a male die, I, (see Fig. 4,) that enters said female die and acts in conjunction therewith to cut the fingers on the sheet metal G, that are to be on the ends of the finished pickets.

On the plunger D, contiguous to the die I, is a male die or punch, J, one edge, $e^2$, of which is adapted to pass close to the edge $d^2$ of the die H, and in conjunction therewith to cut off the projecting piece of the sheet metal G after the fingers have been cut, to thereby form the picket $A^2$, as hereinafter shown.

On the side of the die J opposite to the edge $e^2$ is a guard or plate, $J^2$, that acts to guide the cut-off picket as said die is moved. The under side of this die J has projections $f^2$ at its ends, that are adapted to enter recesses $g^2$ in a female die, L, that is placed beneath the die J and on a lower level than the die H. (See Fig. 6.) The die J also has recesses $f^6$ at the side of the projections $f^2$, (see Fig. 4,) while the female die L has corresponding raised parts $f^3$. As the die J descends it cuts off a picket from the metal sheet G, projecting from the die H, and carries it down onto the female die L, where the projections $f^2$ on the die J press the central fingers of the picket down, while the projecting parts $f^3$ press the outer fingers up into the positions clearly shown in Fig. 6. Within the die L are two vertically-movable plungers, $h^2$, that are pressed upward by springs $i^2$ in the die L. The upper edges of these plungers $h^2$ are normally above the upper surface of the die L. (See Fig. 6.) As the die J descends and presses the picket $A^2$ into the die L, said plungers will descend therewith; but as said die J ascends the plungers $h^2$ will follow it and raise the picket above the upper surface of the die L, so that said picket may be carried along to receive the wires, as hereinafter shown.

$j^2$ are spring-plates that are placed at the ends of the die L, which springs have inwardly-extending shoulders $l^2$, that project in the path of the ends of the picket, and thereby limit its vertical movement by the plungers $h^2$, so as to keep the picket after being carried down by the die J below the level of the die H. Extending longitudinally from the springs $j^2$, and about on a line with the top of the plungers $h^2$, when in their upper position, are rails $m^2$, that are secured at their ends near the springs $j^2$ on suitable supports carried by the bed-plate F. These rails $m^2$ are straight on their inner edges and taper on their outer edges toward their free end, as clearly shown in Fig. 2. These rails $m^2$ are straddled by or receive the fingers of the pickets after they have been struck up or upset by the dies J L and guide said pickets as they are drawn along the machine to receive the wires, as in Fig. 2.

In order to carry the pickets away from the die L, hooks or fingers $o^2$ are pivotally carried on the inner end of a sliding rod, $n^2$, that is suitably guided on the bed F. These hooks $o^2$ are pivoted to $n^2$, as at $p^2$, and are pressed upon at one end by a spring, $q^2$, that is carried by the rod $n^2$, as clearly shown in Fig. 4, so as to keep their hooked ends above the rod $n^2$ in position to engage the pickets.

$r^2$ is a spring-plate that is carried by the rod $n^2$, and that passes between the hooks $o^2$ and under the picket, so as to hold said picket in position against the rails $m^2$. The hooks $o^2$ are adapted to pass under the die H or into recesses therein, (see Fig. 6,) so as to be in proper position behind a picket, as in Fig. 4.

The outer end of the rod $n^2$ is secured to a sliding head, M, that is guided on a projecting rail, N, carried by the frame A. This sliding head M has pivotally secured to it at each side links $s^2$, that are jointed at their free ends to the arms $i$, that are carried by the rock-shaft E. By this means as the shaft E is rocked, the sliding head M, and thereby the sliding rod $n^2$, will be reciprocated. The sliding rod $n^2$ also carries feeding-hooks $t^2$ between the hooks $o^2$ and the sliding head M. These hooks $t^2$ are pressed upon at one end by the spring $q^2$, so as to be in the path of a picket, $A^2$, as seen in Fig. 1.

O is a female die that is carried by the bed-plate F and is situated between the sliding head M and the feed hooks $t^2$, the rod $n^2$ passing through or beneath it. (See Figs. 1 and 7.) The feed-rod $n^2$ carries the pickets from the die H and places them one by one upon the die O, as hereinafter shown; but said pickets may be passed to the die O by other means, if desired.

P is a male die that is carried by the plunger D above the die O. (See Fig. 1.) These dies are adapted to press or stamp the picket $A^2$ when placed between them, and are of the shape shown in Fig. 7, whereby the picket, when pressed by them, is corrugated or grooved longitudinally. These dies also have one or more cross-grooves for receiving and pressing the metal plate about the wire to form a cross-groove in said plate, (see Fig. 12,) and thereby to securely hold the picket on the wire.

The cross-grooves in the dies O P should be undulating—that is, should follow the cross-surface of the longitudinally-grooved dies. By this means the picket or plate is given an undulating or waving cross-groove. By this means great strength and stiffness are given to a thin metal picket or plate; but instead of placing a groove in the die said die may have projections or other means to press up the metal of the picket contiguous to the wire. The male die P carries on one side two cam-like projections, $v^2$, (see Fig. 12,) that are adapted to engage the wires to be secured to the pickets and to press said wires firmly against the ends of the picket between the fingers (see Fig. 10) as said die P descends.

Upon the sliding head M is placed a block, $w^2$, that has a longitudinal groove adapted to receive a grooved part of the picket. This block $w^2$ carries spring-pressed hooks $x^2$, that are adapted to engage a picket when placed upon said block to assist in holding it thereon.

Q is a swinging tongue that is pivotally carried by the head M above the block $w^2$, and it is adapted to bear at its free end upon the block $w^2$, or a picket thereon to hold said picket in position on the block.

Having now shown how the sheet metal G is fed into the machine, the fingers cut therein for the pickets, the picket cut from the sheet, and its fingers struck up, also the feed mechanism for carrying said pickets along and the die for corrugating or crimping said pickets, I will now show how the wire is led into the machine and placed into position on the pickets.

The wire $B^2$ for the pickets is fed into the machine from each side through straightening-rolls R of any suitable construction. (See Fig. 2.) The wires then pass on each side along a post or other contact-piece, $a^4$, and against disks or rollers $b^4$, $d^4$, and $e^4$, said rollers being so arranged as to guide the wire about parallel along the inclined edge of the rails $m^2$ and in the plane of motion of the plate or picket $A^2$; but the rollers $e^4$ could be replaced by stationary or other guides, if desired. From the rollers $e^4$ the wires pass in a straight line, or in the longitudinal axis of the machine through the sliding head M. The rollers $e^4$ are placed just in advance of the free ends of the guide-rails $m^2$, their inner edges being about on a line with the inner edge of said guide-rails. (See Fig. 2.) As the pickets $A^2$ are carried along by the feed-hooks $t^2$ on the sliding rod $n^2$, the fingers on said pickets will embrace the rollers $e^4$, and thereby the wires that are guided by said rollers will be passed in between said fingers and laid against the body part of the picket ready to be pressed or woven together by the dies O P, as hereinafter shown. Thus the plate or picket is deposited on the wire. The supporting rods or axles $f^4$ of the rollers $e^4$ are connected by a bar, $g^4$, that passes over the wires $B^2$ and over the sliding rod $n^2$. This cross-bar $g^4$ carries rollers $h^4$, that are adapted to bear upon the surface of the rollers $e^4$, and to press down the fingers of the picket that pass over said rollers $e^4$. $i^4$ are rollers similar to $h^4$, that are journaled in supports on the bed-plate F, and that bear on the under side of the rollers $e^4$ for the same purpose as the rollers $h^4$. The sheet metal G, when fed into the machine and before it reaches the feed-rollers $p$ $u$, is passed through a guide-head, S, that is carried by the bed-plate F. In the guide-head S is placed a vertically-movable plunger, $j^4$, that carries a knife, T, that, in conjunction with a knife, $T^2$, on the frame A, is adapted to cut off the sheet metal G. The distance between the knife T and the edge $d^2$ of the die H is calculated to be the width of a certain number of pickets, so that when the outer end of a strip of sheet metal, G, has about reached said knife the metal may be cut off, so that only the required quantity of metal will be passed by the feed-rollers to the dies. The knife T is reciprocated as follows: To the plunger $j^4$ is secured a pendent rod, $l^4$, that is jointed to a treadle, $m^4$, carried by the frame A. This treadle, and thereby the knife T, is elevated by a spring, $n^4$, secured to said treadle and to a suitable part of the frame.

In order that the machine may be stopped when the end of a metal sheet, G, has about reached the knife T the following device is provided:

U is an arm that is pivoted to the frame A, and that is adapted to engage the clutch of the pulley $a$. The shaft $o^4$ of this arm U is provided with a crank, $p^4$, that is connected by a rod, $q^4$, with a treadle, $r^4$, suitably supported. The treadle $r^4$ is held down, so as to throw the arm U out of contact with the clutch on the pulley $a$, so that said pulley will rotate the shaft B by means of a latch, $s^4$, that is hung on a guide, $t^4$, through which the treadle $r^4$ passes. (See Fig. 9.) To the latch $s^4$ is secured an arm, $u^4$, which, when being pressed upon by the operator, releases the treadle $r^4$, thereby permitting it to be raised by a spring, $v^4$, secured to said treadle and to the frame A. As said treadle thus rises, the arm U will be thrown to disengage the clutch on the pulley $a$. The latch $s^4$ carries a stud or pin, $w^4$, that passes through a slot in the end of a rod, $x^4$, that passes upward, and is secured to a lever, $y^4$, that is pivoted in the guide-head S. A spiral spring, $z^4$, surrounding the rod $x^4$ and pressing against a shoulder thereon and against the frame A, tends to lower the same. The downwardly-projecting end of the lever $y^4$ is adapted to pass downward through an opening in the guide-head S, but is held in the upward position by resting upon the sheet-metal plate G, from which the pickets are made. When the end of the sheet metal G passes from under the end of the lever $y^4$, said lever will descend through the action of the spring $z^4$, thereby moving the latch $s^4$ out of contact with the treadle $r^4$, whereby said treadle will be elevated and the clutch on the pulley $a$ engaged by the arm U, thereby automatically stopping the machine.

Having now described my improved fence-making machine, I will show how it operates in making fence.

Suppose the sheet-metal strip G to have been fed into the machine until its end is flush with the edge $d^2$ of the die H, the dies I, J, and P to be in the partially-elevated position shown in Fig. 4, the die I to have cut the fingers at the edge of the metal sheet thereunder, and the feed-hooks $o^2$ to be in the position shown in Fig. 4. The machine is now started by rotating the shaft B. As said shaft rotates it will act to elevate the dies carried by the plunger D, at the same time acting through the rock-shaft E, the rod $j$ and lever $l$, shaft $m$, and rollers $p$ $u$ to feed the sheet metal from the die H and under the die J, while at the same time the rod $n^2$ advances under the influence of the arms $i$ on the shaft E, acting on the sliding head M. While the plunger is at its highest point, and until it begins to descend, the sheet metal is still fed forward, the feeding-rod $n^2$ being also fed forward. When about half the width of a picket has been fed from the edge $d^2$ of the die H, the plunger carrying the dies will begin to descend. As said plunger descends the picket continues to be fed forward, as is also the feeding-rod $n^2$. By the time the sheet metal has been fed from the edge $d^2$ for the width of a picket, it will cease to be fed, the feeding-rod $n^2$ also stopping its forward stroke, while the plunger carrying the dies will descend and cut off the projecting piece of sheet metal G, the die J acting with the edge $d^2$ for this purpose. As the die J acts to cut off the metal, as above, the die I acts to punch out the fingers on the part of the sheet metal G next behind the picket just cut. The die J, still continuing to descend after having cut off the picket, carries the picket just cut down onto the die L, thereby depressing the plungers $h^2$. As the die J carries the picket down onto the die L, as above, it acts with said die L to strike up the fingers of the picket, as before shown, so that they shall stand at an angle to the body part of the picket, as in Fig. 4. While the die J is in this its lowest position, the feed-rod $n^2$, with its head M, begins to return, and as said die J then rises and releases the picket, leaving it on the die L and plungers $h^2$, the hooks $o^2$ on the rod $n^2$ will pass under said picket. As said die J continues to rise, and when it reaches the partially-elevated position shown in Fig. 4, the hooks $o^2$ will have passed behind said pickets, as shown in said figure. From this point as the plunger D again rises, as heretofore shown, the feed-rod $n^2$ again advances, and by means of its hooks carries the picket along the rails $m^2$ toward the dies O P, the feed-rollers $p$ $u$ at the same time again feeding forward the sheet metal. When the feed-rod $n^2$ has reached its full forward stroke and begins to recede while the dies are making another picket, the hooks $o$ will leave the picket $A^2$ just moved forward on the rails $m^2$, the lugs $m^6$ on said rails preventing the picket returning. As said feed-rod $n^2$ returns to take another picket from the die L, the hooks $t^2$ on the feed-rod $n^2$ will engage the picket just left by the hooks $o^2$, while the hooks $o^2$ engage another picket on the die L, and as said feed-rod $n^2$ is again moved forward the hooks $t^2$ will carry the picket that has been retained by the lugs $m^6$ along between the rollers $c^4$, which rollers will lay the wires between the fingers on said latter picket. As the feed-rod $n^2$ continues to advance, the picket pushed by the hooks $t^2$ will be laid upon the female die O, while the hooks $o^2$ bring the other picket from the die L, and when the plunger again descends with its dies I J and cut out the fingers, cut off the picket, and strike up the fingers of another picket, as heretofore shown, the die P and the plunger will act on the picket just laid on the lower die, O, to corrugate it, and at the same time by the cams $v^2$ to press the wires against the inner ends of the cross-grooves in the dies O P, pressing the metal of the plate about the wires, thereby forming cross-grooves in the plate or fingers, the wires being themselves curved to follow the cross-corrugations of the picket. After the first picket has been thus corrugated and fastened upon the wires, said picket is drawn forward, say, by hand, the distance that the pickets will be apart on the wires. When the feed-rod $n^2$ reaches its extreme inward position again, the block $w^2$ will pass beneath the picket just drawn forward, the tongue Q and the hooks $x^2$ then engaging the picket upon the block $w^2$, thereby locking the picket to said block. As the feed-rod $n^2$ next advances after another picket has been made, the tongue Q with the block $w^2$ and the hooks $x^2$, will act to draw forward the wires and pickets. I have now shown how the first picket when starting the machine has been made and secured to the wires and placed upon the block $w^2$ to act to feed forward the wires. Each time the feeding-rod $n^2$ now moves forward after a picket has been made and while the plunger is moving up and down it will draw a supply of wire through the straightening-rolls R by the tongue Q engaging and holding a picket on the block $w^2$ in conjunction with the hooks $x^2$.

Each time a picket is cut off and struck up by the dies J L it will be carried away by the feed-rod $n^2$ and passes along the rails $m^2$ to receive the wire between its fingers from the rollers $c^4$, while each time the plunger descends its dies will cut out the fingers, form a picket, and when upon the die O corrugate it, groove it crosswise, and secure it to the wires. As long as the machine is supplied with sheet-metal strips G and wires it will continuously act to make a picket and place it upon the wires at the desired distance apart. When the end of the sheet-metal strip G has reached and passed from under the lever $y^4$, said lever will descend and throw the clutch to stop the machine. To again start the machine, it is only necessary to depress the treadle $r^4$ to again permit the clutch to act.

In Fig. 10 is shown a picket that has a wire at both ends; but said picket may have a single wire, as shown in Fig. 11, if desired. By cutting the picket shown in Fig. 10 between the wires the picket attached to a single wire and shown in Fig. 11 may be made.

Although I have shown a strip of metal, G, of a width to produce the proper length of picket and that is cut into the proper widths for the pickets in the machine, it is evident that pieces of metal of the proper length and width may be placed directly on the die H by suitable means; also that strips of metal of the proper width for the pickets may be placed directly on the die H and cut off to the proper length for the pickets instead of cutting them to the proper width, as shown in the drawings. In the above cases the feed-rollers $p$ $u$ may be dispensed with or otherwise suitably arranged.

For some styles of pickets it may not be necessary to corrugate them through their entire length; but they may have other desired shapes. By making the dies O P of suitable form the shape of the finished picket may be determined.

In addition to making fences as herein shown, my improved machine may be used for attaching sheet metal or other material to wires, rods, or strips for other purposes, and the term "picket" herein used is intended to cover such other pieces as may be used.

Having now described my invention, what I claim is—

1. The finger-cutting dies H I, combined with the dies J L, for cutting the picket off a sheet and stamping up the fingers, and with means, substantially as described, for actuating said dies and feeding said sheet, as specified.

2. The finger-cutting dies H I and the dies J L, for cutting the picket off a sheet and stamping up the fingers, combined with means, substantially as described, for actuating the dies and for carrying the pickets away from the die L to receive the wire, as specified.

3. The dies H I and J L, for forming the picket $A^2$ and striking up its fingers, combined with means, substantially as described, for carrying the picket away from said dies, and with means, substantially as described, for placing the wire between the fingers of the picket, as specified.

4. The dies H I and J L, for forming the picket and striking up its fingers, and means, substantially as described, for carrying the picket away from the dies, combined with means, substantially as described, for placing the wire between the fingers of the picket and for closing the fingers on the wire, as specified.

5. The dies H I and J L, for forming a picket, and means, substantially as described, for carrying the picket away from the dies, combined with means, substantially as described, for placing a wire between the fingers of the picket, and with the dies O P, for corrugating the picket and for closing the fingers of the picket upon the wire, substantially as described.

6. The dies J L, for stamping up the fingers on plate $A^2$, combined with the feeding-rod $n^2$, having hook $o^2$, to engage said plate $A^2$ and carry it from the die L, and with means, substantially as described, for reciprocating the feeding-rod $n^2$ and for guiding the picket, as specified.

7. The die H, having cutting-edge $d^2$, die L, that is lower than the die H, and the plungers $h^2$, that are in the die L, combined with the die J, having cutting-edge $e^2$, and the springs $j^2$ at the ends of the die L, and that limit the upward movement of the picket on the die L, substantially as described.

8. The dies J L, plungers $h^2$, and springs $j^2$, combined with the feeding-rod $n^2$, having hook $o^2$, and with the rails $m^2$, for guiding the picket from the die L, substantially as described.

9. The feed-rollers $p$ $u$, dies H I, and stripper $w$, combined with the dies J L, plungers $h^2$, springs $j^2$, rails $m^2$, and feeding-rod $n^2$, having means to engage a picket, all arranged substantially as herein shown and described.

10. The die L, plungers $h^2$, springs $j^2$, and rails $m^2$, having lugs $m^6$, combined with the feed-rod $n^2$, having hooks $o^2$ $t^2$, for engaging and pushing pickets along said rails, and with means, substantially as described, for reciprocating said feed-rod $n^2$, as specified.

11. The dies J L, rails $m^2$, and feed-rod $n^2$, having means for feeding a picket, combined with the guides $e^4$, arranged to guide the wires and pass them between the fingers of the picket, substantially as described.

12. The plunger D, carrying dies I, J, and P, and means, substantially as described, for reciprocating said plunger, combined with the dies H L O, picket-feeder $n^2$, having means to engage a picket, and guides $e^4$, for passing the wire between the fingers of the picket, substantially as described.

13. The feed-rod $n^2$, having picket-engaging hooks, rails $m^2$, and the wire-guides $e^4$, combined with the rollers $h^4$ $i^4$, that are adapted to bear upon the guides $e^4$, to press the fingers of the picket as they pass over said wire-guides, substantially as described.

14. The picket-feeder $n^2$, having means to engage a picket, and wire-guides $e^4$, that pass the wire between the fingers of the picket, combined with the dies O P, that corrugate the picket and close the fingers upon the wires, substantially as described.

15. The picket-feeder $n^2$, having hooks to engage the picket, combined with the tongue Q, substantially as described, for engaging a finished picket to draw the wire or wires and with the shaft E and connecting-rods, substantially as described, for reciprocating said feeder $n^2$, substantially as specified.

16. The die O, that is adapted to receive a picket, combined with the die P, having cam projections $v^2$, arranged to press the wires against the ends of the picket as the die P descends, substantially as described.

17. The combination of the feed-rollers $p$ $u$, dies H I, for cutting fingers for the picket, dies G L, for cutting off the picket and stamping up its fingers, feeder $n^2$, hooks on said feeder for carrying the pickets from the die L, wire-guide $e^4$, for passing the wire between the fingers of the picket, dies O P, for corrugating the picket and securing it to the wires, and with means, substantially as described, for moving the dies I, J, and P, and for reciprocating the feeder $n^2$, substantially as described.

18. The picket-feeder $n^2$, having hooks to engage the picket, combined with the sliding head M, grooved block $w^2$, and tongue Q, and with a rock-shaft, E, connected with said head and with the main shaft B, whereby as said shaft rotates the sliding head M and the feeder $n^2$ will be reciprocated, substantially as described.

19. The combination of the dies H I, for cutting fingers for the picket, dies J L, for cutting off the picket and for stamping up the fingers, feeder $n^2$, having means for carrying pickets from the die L, wire guide $e^4$, for passing the wire between the fingers of the picket, dies O P, for corrugating the picket and securing it to the wires, and with means, substantially as described, for moving the dies I, J, and P and for reciprocating the feeder $n^2$, substantially as described.

20. The dies O P, having longitudinal grooves for corrugating a metal plate, and cross-grooves, one in each die, for receiving and pressing the metal plate about the wire, substantially as described, and for the purpose specified.

21. The dies O P, having longitudinal grooves for corrugating a metal picket, and cross-grooves, one in each die, of undulating line for receiving and pressing the metal plate about the wire, substantially as described, and for the purpose specified.

22. The combination, with dies, substantially as described, for fastening a sheet-metal plate or picket to a continuous length of wire, of means, substantially as described, for engaging and thereby pushing or carrying said plate or picket away from said dies, said picket so carried away from the dies drawing a supply of wire with it for other plates or pickets, substantially as described.

23. The combination of mechanism, substantially as described, for feeding the fingered picket $A^2$ along guides $m^2$ with said guides, and with rollers R $b^4$ $e^4$, for conducting the wire $B^2$ in the plane of motion of the picket $A^2$ gradually into place between the fingers of said picket, as specified.

24. The combination of means, substantially as described, for upsetting the fingers of the fingered picket $A^2$ and feeding it with the guide-rails $m^2$, all arranged so that the upset fingers of the plate $A^2$ will straddle the rails $m^2$, substantially as and for the purpose described.

25. The guide-rails $m^2$, having inclined outer edges, and means, substantially as described, for first feeding the wires $B^2$ substantially parallel to the inclined edges of the rails $m^2$, and afterward substantially parallel to the longitudinal axis of the machine, combined with means for feeding the plate $A^2$ first along the guide-rails $m^2$ and afterward depositing it upon the wires and feeding it therewith, substantially as herein shown and described.

PURCHES MILES.

Witnesses:
T. F. BOURNE,
HARRY M. TURK.